(12) United States Patent
Giammarco et al.

(10) Patent No.: US 8,846,192 B2
(45) Date of Patent: Sep. 30, 2014

(54) ENHANCED FILM CARRIER

(76) Inventors: Ralph Giammarco, New Berlin, WI (US); Michael Kolman, West Allis, WI (US)

( * ) Notice: Subject to any disclaimer, the term of this patent is extended or adjusted under 35 U.S.C. 154(b) by 45 days.

(21) Appl. No.: 13/354,198

(22) Filed: Jan. 19, 2012

(65) Prior Publication Data

US 2013/0189468 A1    Jul. 25, 2013

(51) Int. Cl.
 *B32B 15/16*    (2006.01)
 *C09J 7/02*    (2006.01)
(52) U.S. Cl.
 USPC ........... 428/328; 428/332; 428/334; 428/337; 428/339
(58) Field of Classification Search
 USPC .............. 428/402, 381, 323, 220, 212, 313.9, 428/208, 215, 328, 334, 32.74, 40.1, 40.9, 428/900; 156/247, 249; 977/778, 810, 724
 See application file for complete search history.

(56) References Cited

U.S. PATENT DOCUMENTS

| | | | |
|---|---|---|---|
| 4,157,410 A * | 6/1979 | McClintock | 428/40.6 |
| 4,230,785 A * | 10/1980 | Carlson et al. | 430/56 |
| 4,253,899 A * | 3/1981 | Takemoto et al. | 156/277 |
| 4,879,161 A | 11/1989 | Raymond et al. | |
| 5,312,683 A * | 5/1994 | Chou et al. | 428/32.74 |
| 5,403,025 A * | 4/1995 | Shanley | 283/81 |
| 5,647,935 A * | 7/1997 | Hoshino et al. | 156/231 |
| 5,807,623 A * | 9/1998 | Chess | 428/195.1 |
| 5,914,158 A * | 6/1999 | McGuiness | 428/13 |
| 6,171,681 B1 * | 1/2001 | Mascarenhas et al. | 428/141 |
| 6,206,292 B1 | 3/2001 | Robertz et al. | |
| 6,361,844 B1 * | 3/2002 | Ou-Yang | 428/41.5 |
| 6,514,587 B1 | 2/2003 | Fernandez-Kirchberger et al. | |
| 6,541,101 B1 | 4/2003 | Cook et al. | |
| 7,087,280 B2 * | 8/2006 | Neuburger | 428/40.1 |
| 7,438,972 B2 * | 10/2008 | Faler et al. | 428/323 |
| 2007/0166523 A1 * | 7/2007 | Fukaya et al. | 428/292.1 |
| 2009/0163363 A1 * | 6/2009 | Moreland et al. | 503/201 |
| 2009/0196826 A1 * | 8/2009 | Gao et al. | 424/9.3 |
| 2010/0028538 A1 | 2/2010 | Jones et al. | |
| 2010/0266862 A1 * | 10/2010 | Lugg et al. | 428/551 |
| 2011/0070403 A1 | 3/2011 | Fischer | |

* cited by examiner

*Primary Examiner* — Monique Jackson
(74) *Attorney, Agent, or Firm* — Absolute Technology Law Group, LLC

(57) ABSTRACT

An enhanced film carrier with two release films, structurally joined by an adhesive creating a structural bonding layer, allows stability during printing without having a paper layer. The release films are infused with nanometallic particles to form a nano-ionic bond force field with nanometallic transportable graphic film. The release films may be identical or distinct, and, in some embodiments, release films may be smooth or textured to provide a gloss or matte finish to a nanometallic transportable graphic.

16 Claims, 4 Drawing Sheets

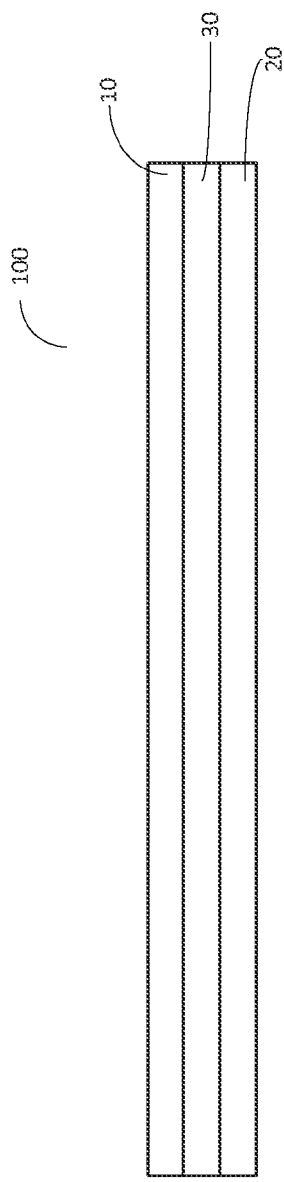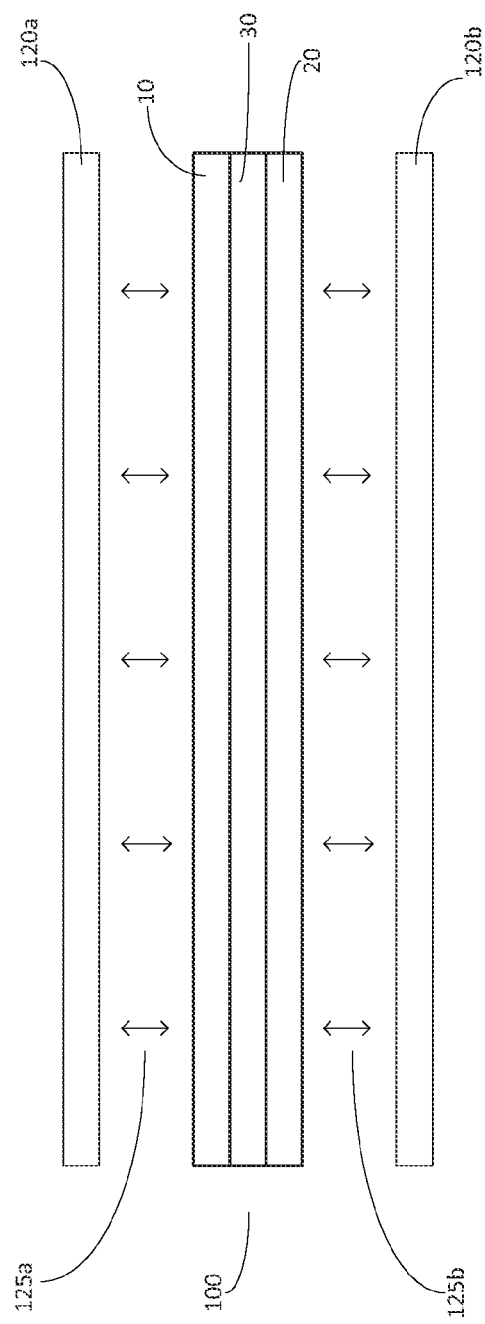

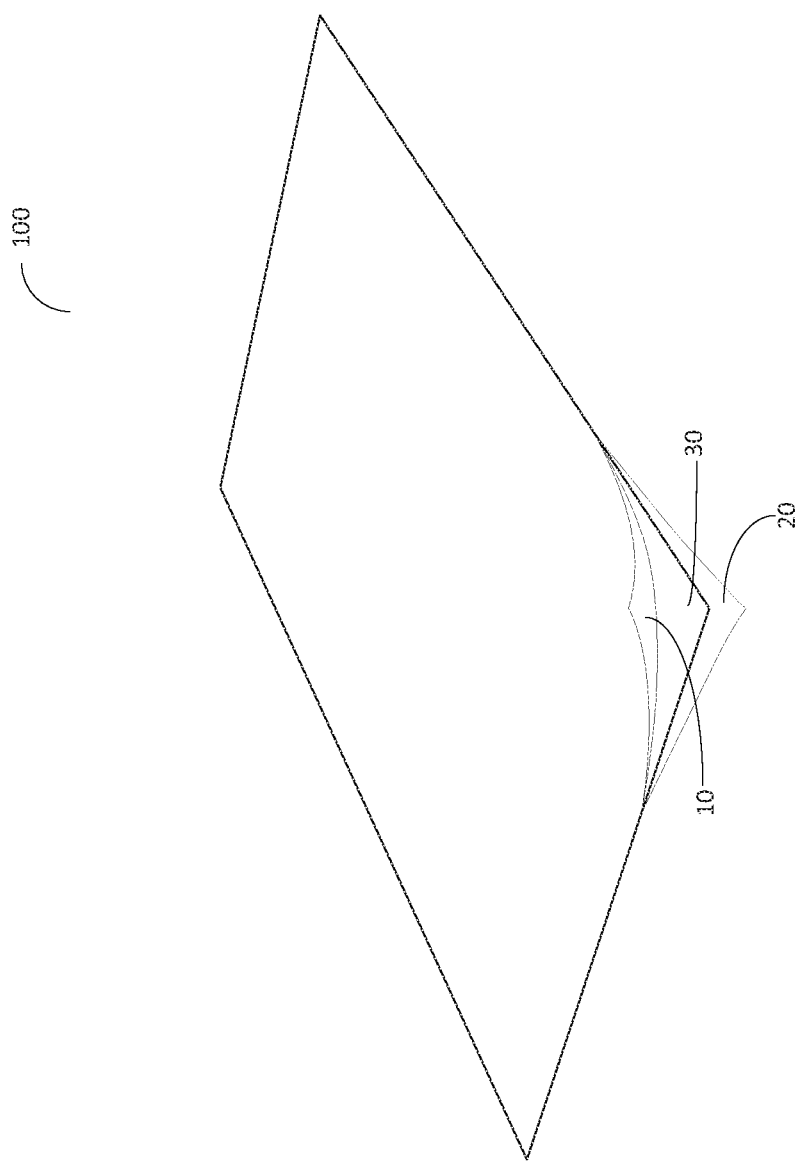

US 8,846,192 B2

ENHANCED FILM CARRIER

CROSS-REFERENCE TO RELATED APPLICATIONS

This application is related to co-pending U.S. application Ser. No. 13/326,080, entitled "Nanometallic Transportable Graphic System," filed on Dec. 12, 2011, published as US 2012/0088097 A1 which is hereby incorporated by reference in its entirety.

FIELD OF INVENTION

The present invention relates to the field of printing materials and substrates and more specifically to a double-sided, reusable film carrier component for use with nanometallic transportable graphics system.

TERMS OF ART

FIG. 1 illustrates an exemplary embodiment of an enhanced film carrier.

FIG. 2 illustrates an exemplary embodiment of an enhanced film carrier with printable transportable graphic film binding both release films.

FIG. 3 illustrates the layers of an exemplary enhanced film carrier.

TERMS OF ART

Figure 4:
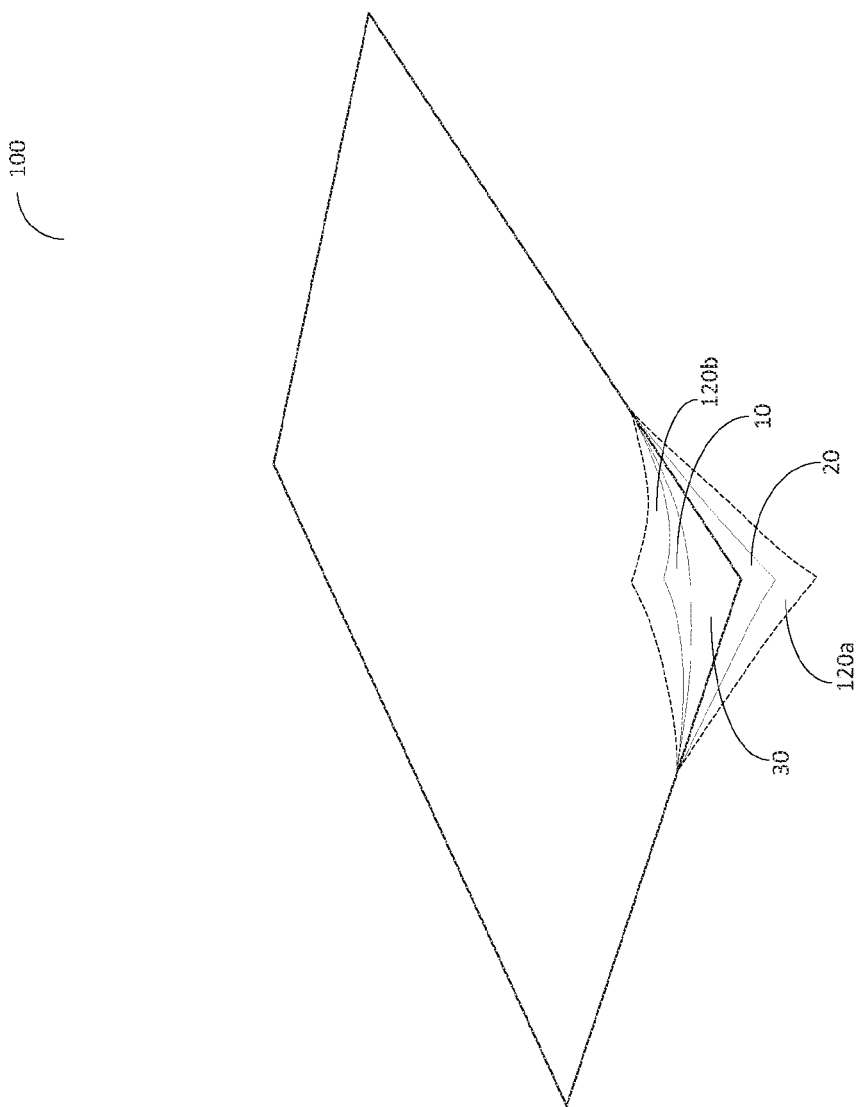
FIG. 4 illustrates the layers of an exemplary enhanced film carrier carrying printable transportable graphic film on both release films.

As used herein, the term "metallically infused" means having a composition in which one or more metallic particles are dispersed or suspended.

As used herein, the term "nano-ionic bond force field" means an ionic bond which is created by the presence of nanometallic particles in one surface that bond to the nanometallic particles in another surface without the use of adhesive. A nano ionic bond force field creates a physical bond between the surfaces.

As used herein, the term "polyacrylate" means a material created of acrylate polymers. Polyacrylate is usually transparent and has some elasticity.

As used herein, the term "polyolefin" means a polymer created from an olefin, or alkene, as a monomer.

As used herein, the term "polyurethane" means a material created by a polymer chains containing a plurality of organic units joined by carbonate (urethane) links. Polyurethane is usually elastic and durable and experiences less wear than other similar materials.

BACKGROUND

Films and substrates for printing are provided on carriers, which provide stability while storing the film, printing graphics and drying printed images. Once the film is removed from the carrier, however, the carrier needs to be disposed of. For each square inch of film, a square inch of carrier waste is created.

Because the ratio of film to carrier is 1:1, half of the space used to store film is taken up by material which will eventually be disposed of.

It is desirable to create a carrier which is capable of having usable film on both sides. By providing usable film on both sides of a carrier component, the ratio of film to carrier becomes 2:1. The amount waste generated and storage space necessary per square inch of film is therefore reduced by 50%.

Because many printing methods require heat treatments or other processes to cure a printed graphic, or adhere it to a surface, it has been it impractical to create a double-sided carrier. The treatment used to set a graphic on one side of the carrier damages the otherwise usable film on the opposite side of the carrier.

Some carriers also incorporate paper. Paper will absorb moisture in the air, causing the carrier to curl or warp. It is difficult to print on curled or warped surfaces. Graphics may not print properly and the printing material may need feed properly into the printer, damaging the printing material, printer or both.

It is desirable to develop a double-sided carrier which does not incorporate a paper component.

Current carriers are also finish-specific. For example, when printing a graphic with a glass finish, a carrier with a smooth release surface is necessary. Matte finishes require a carrier with an embossed or textured release surface. Businesses print graphics requiring different finishes must therefore stock identical films on multiple carriers.

It is desirable to develop a carrier which may be used for both matte finishes and gloss finishes.

SUMMARY OF THE INVENTION

The present invention is an enhanced film carrier with two release films structurally joined by an adhesive creating a structural bonding layer. The release films are infused with nanometallic particles to form a nano-ionic bond force field with nanometallic transportable graphic film. The release films may be identical or distinct, and, in some embodiments, release films may be smooth or textured to provide a gloss or matte finish to a nanometallic transportable graphic.

DETAILED DESCRIPTION OF INVENTION

For the purpose of promoting an understanding of the present invention, references are made in the text to exemplary embodiments of a nanometallic graphic apparatus and system, only some of which are described herein. It should be understood that no limitations on the scope of the invention are intended by describing these exemplary embodiments. One of ordinary skill in the art will readily appreciate that alternate but functionally equivalent materials and structures may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 illustrates an exemplary embodiment of enhanced film carrier 100. Enhanced film carrier 100 contains first release film 10 and second release film 20, joined by adhesive 30.

As illustrated in FIG. 1, first release film 10 is polyester coated with a release coating and second release film 20 is an embossed or textured polyolefin coated with a release coating. First release film 10 is approximately 1.05 mm thick; second release film 20 is approximately 3.05 mm thick. In further exemplary embodiments, first release film 10 and second release film 20 may range in thickness from 0.80 mm to 3.50 mm.

This range of thicknesses for first release film 10 and second release film 20 is critical. If first and second release films 10, 20 are thinner, enhanced film carrier 100 will not have sufficient structural stability to support printable layers, which are layered on top of first and second release films 10, 20, during printing. If first and second release films 10, 20 are too thick, enhanced film carrier 100 is not usable with certain printers. Additionally, adhesive layer 30 may be unable to form a structural bond between first and second release films 10, 20 if release films 10, 20 are too thick and, therefore, heavy.

In the exemplary embodiment shown, first release film 10 is a smooth release film, while second release film 20 is a textured release film. As a result, enhanced film carrier 100 may be used to print either gloss- or matte-finished graphics. In other exemplary embodiments, enhanced film carrier may contain two identical release films.

Multiple release coatings are known in the art. In the exemplary embodiment shown, release coatings on first release film 10 and second release film 20 may be any release coating, including, but not limited to, acrylic coatings. In some exemplary embodiments, release coatings on first release film 10 and second release film 20 may be identical, while in other exemplary embodiments, first release film 10 and second release film 20 may be different.

In the exemplary embodiment shown, first release film 10 and second release film 20 are infused with nanometallic particles including, but not limited to, copper, silver, platinum, zinc, zirconium, gold, iridium, metal alloys and combinations of these metallic particles and various other alloys. The nanometallic particles allow release films 10, 20 to create nano-ionic bond force fields between release films 10, 20 and any printable layers applied to enhanced film carrier 100.

In the exemplary embodiment shown, adhesive 30 is a pressure sensitive adhesive approximately 0.5 mm thick. A pressure sensitive adhesive allows enhanced film carrier 100 to be used in situations where heat treatment of a film is required. However, in further exemplary embodiments, adhesive 30 may be any adhesive known in the art, and adhesive 30 might be specifically selected based on the particular use of enhanced film carrier 100. Depending on the adhesive used and the anticipated use of enhanced film carrier 100, adhesive may range in thickness from 0.02 mm to 0.08 mm.

The thickness of adhesive layer 30 is critical. If too thin or too thick, adhesive layer 30 will not create a structural bond with release films 10, 20. If the structural bond is weak or improperly formed, enhanced film carrier 100 will not have enough structural stability to support any printable surfaces applied to release films 10, 20. Enhanced film carrier 100 may also lose its durability and structural stability when going through the printing process, if the structural bond formed by adhesive layer 30 is inadequate. It is also important that adhesive layer 30 create a uniform bond between itself and release films 10, 20, which is difficult to control when adhesive layer 30 is too thick or too thin.

Because enhanced film carrier 100 does not contain any paper layer, enhanced film carrier 100 is particularly suitable for flat sheet applications. For example, some printers, such as web-led printers, require carriers to be very flat to run through the printer. Paper absorbs moisture in the air, causing carriers to curl. Curled carriers are not only harder to store, but also limit the printers in which the carrier may be used. Enhanced film carrier 100 does not incorporate any paper component, allowing it to be used with almost any printer, even printers such as the web-fed printer, which need very flat carriers.

Enhanced film carrier 100 is also thinner because it does not incorporate a paper layer.

As illustrated in the exemplary embodiment shown in FIG. 1, each layer (release layers 10, 20 and adhesive layer 30) have a constant thickness. It is desirable for enhanced film carrier 100 to have approximately a constant thickness, and each layer 10, 20, 30 to have approximately a constant thickness, to provide consistency when printing on enhanced film carrier 100. While in the exemplary embodiment shown, each layer 10, 20, 30 is visually represented as having an equal thickness, the specific thickness of individual layers 10, 20, 30 may differ for a specific enhanced film carrier 100.

FIG. 2 illustrates enhanced film carrier 100 with nanometallic transportable graphic film 120a, 120b bound to release films 10, 20. In the exemplary embodiment shown, release films 10, 20 and nanometallic transportable graphic film 120a, 120b are infused with nanometallic particles which create nano-ionic bond force fields 125a, 125b to releasably secure nanometallic transportable graphic film 120a, 120b to release films 10, 20.

As illustrated in FIG. 2, enhanced film carrier 100, specifically release films 10, 20, are infused with nanometallic particles including, but not limited to, copper, silver, platinum, zinc, zirconium, gold, iridium, metal alloys and combinations of these metallic particles and various other alloys, creating nano-ionic bond force fields 125a, 125b between nanometallic transportable graphic film 120a, 120b and enhanced film carrier 100.

Enhanced film carrier 100 functions as a base layer which stabilizes nanometallic transportable graphic film 120a, 120b during the printing process. Release films 10, 20 are specifically designed to be easily disengaged from nanometallic transportable graphic film 120a, 120b while still providing a stable and uniform surface adhesion. In some embodiments, release films 10, 20 may be designed with a low concentration of nanometallic particles in order to easily disengage nanometallic transportable graphic film 120a, 120b.

In some exemplary embodiments, nano-ionic bond force fields 125a, 125b are resilient to temperature, moisture, acid, pressure and solvents, allowing release films 10, 20 to securely bind nanometallic transportable graphic film 120a, 120b. However, nano-ionic bond force fields 125a, 125b may be interrupted by certain forces or substances in order to remove nanometallic transportable graphic film 120a, 120b from enhanced film carrier 100. For example, in some exemplary embodiments, nano-ionic bond force fields 125a, 125b may be interrupted by certain physical means, including, but not limited to, certain fluids or forces stronger than the attractive force which is creating nano-ionic bond force fields 125a, 125b.

In the exemplary embodiment shown in FIG. 2, nanometallic enhanced film carrier 100 and transportable graphic film 120a, 120b may contain a plurality of nanometallic or metallic particles distributed throughout their volumes. In some exemplary embodiments, metallic particles may be evenly or unevenly distributed. In further exemplary embodiments, metallic particles may be contained within individual layers of enhanced film carrier 100.

In the exemplary embodiments described, metallic particles are of the same substance and oriented in the same direction. In further exemplary embodiments, metallic particles may be oriented in different directions. In still further exemplary embodiments, enhanced film carrier 100 may contain nanometallic particles of different substances. For example, nanometallic particles may be copper, silver, platinum, zinc, zirconium, gold, iridium, metal alloys and combinations of these metallic particles and various other alloys.

In exemplary embodiments where metallic particles are contained within layers of enhanced film carrier 100, each layer may contain a different type of metallic particle, different concentration of metallic particles and/or different orientation or distribution of metallic particles. In some exemplary embodiments, metallic particles may be specifically chosen to help transportable graphic film 120a, 120b bind to enhanced film carrier 100.

In the exemplary embodiments described, the concentration of nanometallic particles in the layers of enhanced film carrier 100 range between 10 parts-per-million (ppm) to 100 ppm. In some embodiments, the concentration of nanometallic particles may be varied depending on the bonding strength, or peel force (measured in grams per inch), desired and the bonding surface. For example, as the concentration of nanometallic particles increases, the strength of the nano-ionic bond force fields 125a, 125b increases. However, the strength ceases to increase once a maximum concentration is reached. The resulting values create an adhesion curve. The specific concentration of nanometallic particles for a given enhanced film carrier 100 may be selected based on the adhesion curve for a desired target surface.

The range of concentration of nanometallic particles (10 ppm to 100 ppm) is a critical range. To prevent transportable graphic films 120a, 120b from being peeled away from enhanced film carrier 100 during printing, yet still allows transportable graphic films 120a, 120b to be easily removed from enhanced film carrier 100 when desired, nano-ionic bond force fields 125a, 125b need to be of constant or approximately constant strength across enhanced film carrier 100. Nano-ionic bond force fields 125a, 125b also need to be strong enough to hold transportable graphic films 120a, 120b stably during printing, yet weak enough to allow manual separation of transportable graphic films 120a, 120b from enhanced film carrier to be enough force to break nano-ionic bond force fields 125a, 125b.

Depending on the nanometallic particles present in enhanced film carrier 100 and/or transportable graphic films 120a, 120b, nano-ionic bond force fields 125a, 125b may form more readily at certain temperatures. In the exemplary embodiments described, nano-ionic bond force fields 125a, 125b are readily formed and maintained at temperatures between −40 and 400 degrees Fahrenheit without the use of additional adhesives or other treatments. In some exemplary embodiments, nano-ionic bond force fields 125a, 125b may form outside of that temperature range if adhesives or treatments are used.

As illustrated in FIG. 2, both transportable graphic films 125a, 125b are identical. In further exemplary embodiments, transportable graphic films 125a, 125b may have different properties, contain different types, concentrations and sizes of nanometallic particles, or be configured to provide different resulting graphics.

FIG. 3 illustrates the layers of enhanced film carrier 100. In the exemplary embodiment illustrated, enhanced film carrier 100 appears as a single sheet, but is really a composite of two release films 10, 20 joined by adhesive layer 30, which in the exemplary embodiment shown is a pressure sensitive adhesive. In other embodiments, enhanced film carrier 100 may contain additional layers, although still retaining the thinness, flexibility and appearance of a single, thin sheet.

In further exemplary embodiments, enhanced film carrier 100 may contain additional layers, such as a stabilizing or supportive layer to increase the rigidity of enhanced film carrier 100. Enhanced film carrier 100 may also contain protective layers, whether removable or not, to protect release films 10, 20 prior to bonding with transportable graphic films.

In the exemplary embodiment shown, enhanced film carrier 100 is illustrated as a single rectangular sheet. However, in further embodiments, enhanced film carrier 100 is provided as a roll. In such embodiments, release films 10, 20 may be in physical contact or close physical proximity. When release films 10, 20 are nanometallically infused, release films 10, 20 may be specifically infused with certain nanometallic particles which prevent release films 10, 20 from forming a strong nano-ionic bond force field.

FIG. 4 illustrates an exemplary enhanced film carrier 100 with nanometallic transportable graphics film 120a, 120b bound to release films 10, 20. Despite the addition of nanometallic transportable graphics film 120a, 120b, enhanced film carrier 100 retains is thin, single sheet quality.

In the exemplary embodiment shown, release film 10 is a smooth release film specifically configured to create a graphic with a gloss finish, while release film 20 is textured and specifically configured to create a graphic with a matte finish. In further exemplary embodiments, release films 10, 20 may be identical or configured to provide the same resulting finish on a graphic.

Figure 5:
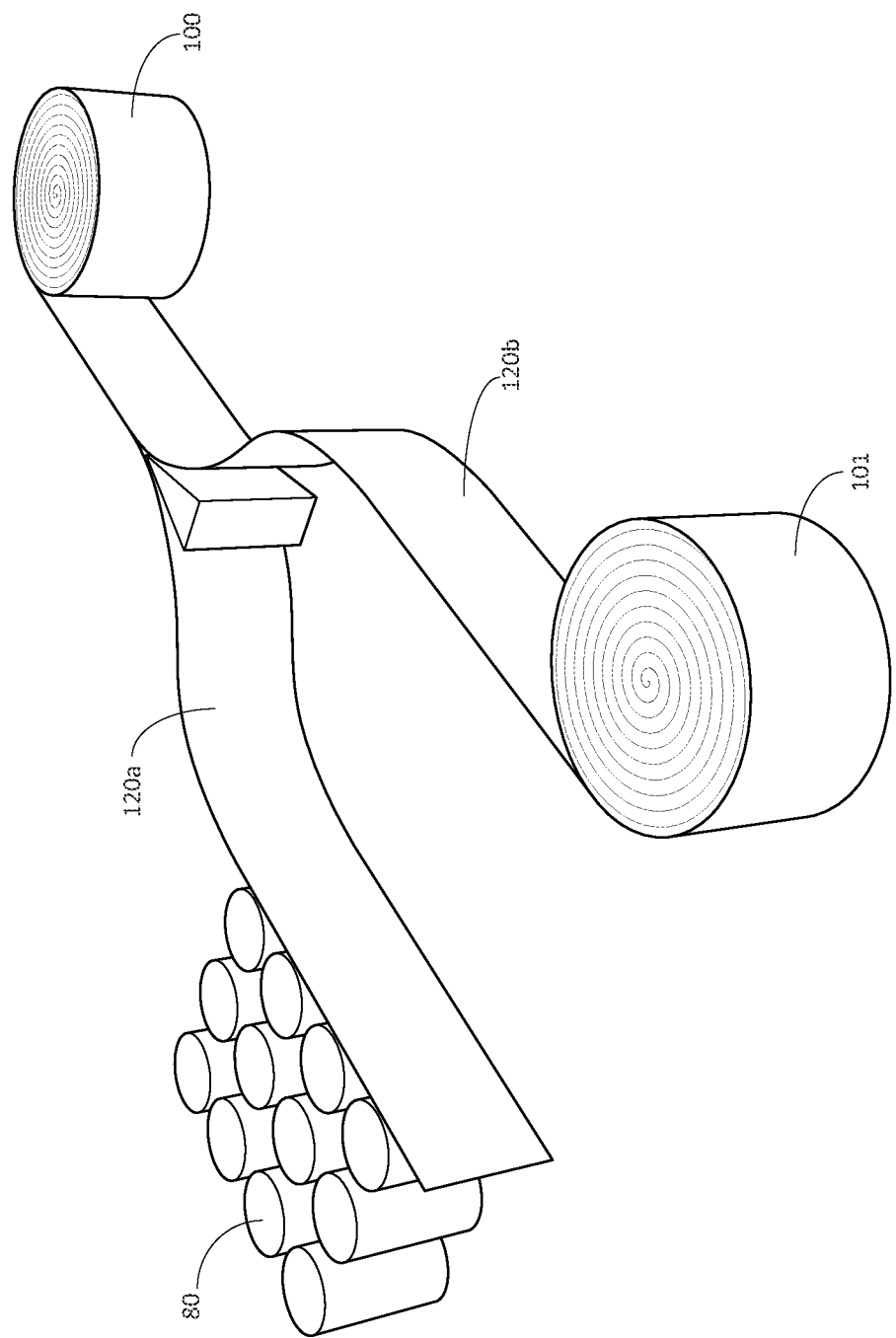
FIG. 5 illustrates an exemplary use for enhanced film carrier.

FIG. 5 illustrates an exemplary enhanced film carrier 100 in use for bottle labeling. In the exemplary embodiment shown, enhanced film carrier 100 contains nanometallic transportable graphic film 120a, 120b on release films 10, 20, respectively. As enhanced film carrier 100 is unwound, nanometallic transportable graphic film 120a is removed from enhanced film carrier 100 and applied to bottles 80 as enhanced film carrier 100, with nanometallic transportable graphic film 120b, is rewound as reusable enhanced film carrier 101. Reusable enhanced film carrier 101 may then be used in place of enhanced film carrier 100 for further labeling.

In the exemplary embodiment shown, nanometallic transportable graphic film 120a is removed from release film 10, while enhanced film carrier 100 is rewound with nanometallic transportable graphic film 120b still bound to release film 20. In further exemplary embodiments, nanometallic transportable graphic film 120b may be removed while enhanced film carrier 100 is rewound with nanometallic graphic film 120a still bound to release film 10. In still further exemplary embodiments, nanometallic transportable graphic films 120a, 120b may both be removed from enhanced film carrier 100 simultaneously or at approximately the same time, so that enhanced film carrier 100 is not rewound with remaining nanometallic transportable graphic film.

The illustration shown in FIG. 5 depicts a single exemplary use and application of enhanced film carrier 100. Labeling indicia are printed on nanometallic transportable graphic film 120a, 120b, and nanometallic transportable graphic film 120a, 120b is release from one side of enhanced film carrier 100 at a time for labeling bottles 80. In further exemplary embodiments, enhanced film carrier may be used in applications and industries, other than labeling applications, including, but not limited to, the digital printing industry, photography and photography publishing industries, display industry (e.g., banners, signs, posters, point-of-purchase displays), graphics industry, industrial identification industry, textile industry, auto industry, packaging industry and advertising industry.

Unlike traditional carrier films having a single printable surface, enhanced carrier film 100 contains two printable surfaces. Because enhanced film carrier 100 contains two printable films (i.e., nanometallic transportable graphic films 120a, 120b), users save storage space and the overall amount of waste generated is decreased.

What is claimed is:

1. A double-sided carrier for transporting film on which graphics are printed through a printer, wherein said carrier is comprised of:
    a first release film layer having a thickness between 0.80 mm and 3.50 mm, wherein said first release film layer is a polymer layer, and is infused with nanometallic particles in a concentration between 10 ppm and 100 ppm;
    a second release film layer having a thickness between 0.80 mm and 3.50 mm, wherein said second release film layer is a polymer layer, wherein said second release film layer is infused with nanometallic particles in a concentration between 10 ppm and 100 ppm;
    a structural bonding layer between said first release film layer and said second release film layer; and
    at least one graphic film layer infused with nanometallic particles in a concentration between 10 ppm and 100 pm, wherein said graphic film layer is in direct contact with and is releasable from at least one of said first release film layer and said second release film layer.

2. The carrier of claim 1, said structural bonding layer comprising an adhesive between said first and second release film layers, wherein said adhesive is a pressure-sensitive adhesive.

3. The carrier of claim 2 wherein said structural bonding layer has a thickness of approximately 0.05 mm.

4. The carrier of claim 2 wherein said structural bonding layer has a thickness between 0.02 mm and 0.08 mm.

5. The carrier of claim 1 wherein one of said first and second release film layers has a thickness of approximately 1.05 mm.

6. The carrier of claim 1 wherein one of said first and said second release film layers has a thickness of 3.05 mm.

7. The carrier of claim 1 wherein said first release layer has a thickness of approximately 1.05 mm and said second release film layer has a thickness of approximately 3.05 mm.

8. The carrier of claim 1 wherein said first and said release film layers are selected from the group consisting of a smooth release film, a textured release film, and combinations thereof.

9. The carrier of claim 1 wherein at least one of said first and second release film layers is selected from the group consisting of polyester coated with a release coating, smooth polyolefin coated with a release coating, textured polyolefin coated with a release coating and combinations thereof.

10. The carrier of claim 1 wherein said first and said second release films are identical.

11. The carrier of claim 1 wherein said nanometallic particles are selected from the group consisting of copper, silver, platinum, zinc, zirconium, gold, iridium, metal alloys and combinations thereof.

12. A double-sided carrier for transporting film on which graphics are printed through a printer, wherein said carrier is comprised of:
    a first release film layer having a thickness between 0.80 mm and 3.50 mm, wherein said first release film layer comprises a polymer selected from the group consisting of polyacrylate, polyester, and polyolefin, wherein said first release film layer is infused with nanometallic particles in a concentration between 10 ppm and 100 ppm;
    a second release film layer having a thickness between 0.80 mm and 3.50 mm, wherein said second release film layer comprises a polymer selected from the group consisting of polyacrylate, polyester, and polyolefin, wherein said first release film layer is infused with nanometallic particles in a concentration between 10 ppm and 100 ppm;
    a structural bonding layer between said first release film layer and said second release film layer; and
    at least one graphic film layer infused with nanometallic particles in a concentration between 10 ppm and 100 pm, wherein said graphic film layer is in direct contact with and is releasable from at least one of said first release film layer and said second release film layer.

13. The carrier of claim 12 wherein said nanometallic particles are selected from the group consisting of copper, silver, platinum, zinc, zirconium, gold, iridium, metal alloys and combinations thereof.

14. The carrier of claim 12, said structural bonding layer comprising an adhesive, wherein said structural bonding layer creates a structural bond between said release film layers and wherein said structural bonding layer has a thickness of approximately 0.05 mm.

15. The carrier of claim 14 wherein said structural bonding layer has a thickness between 0.02 mm and 0.08 mm.

16. The carrier of claim 12 wherein said first release film layer has a thickness of approximately 1.05 mm and said second release film layer has a thickness of approximately 3.05 mm.

* * * * *